(12) United States Patent  (10) Patent No.: US 6,657,687 B2
Takizawa  (45) Date of Patent: Dec. 2, 2003

(54) LIQUID CRYSTAL DISPLAY, MANUFACTURING METHOD THEREOF, AND ELECTRONIC APPLIANCE

(75) Inventor: Keiji Takizawa, Suwa (JP)

(73) Assignee: Seiko Epson Corporation (JP)

( * ) Notice: Subject to any disclaimer, the term of this patent is extended or adjusted under 35 U.S.C. 154(b) by 142 days.

(21) Appl. No.: 09/900,502

(22) Filed: Jul. 6, 2001

(65) Prior Publication Data

US 2003/0016321 A1 Jan. 23, 2003

(51) Int. Cl.[7] .............................................. G02F 1/1335
(52) U.S. Cl. ........................ 349/106; 349/113; 349/122; 349/160
(58) Field of Search .................................. 349/106, 113, 349/114, 122, 155, 156, 160, 187; 359/891; 430/7, 20, 321

(56) References Cited

U.S. PATENT DOCUMENTS

2002/0145688 A1 * 10/2002 Sekiguchi .................. 349/114

FOREIGN PATENT DOCUMENTS

JP    11-183892    * 7/1999

* cited by examiner

Primary Examiner—Robert H. Kim
Assistant Examiner—Tai Duong
(74) Attorney, Agent, or Firm—Harness, Dickey & Pierce, P.L.C.

(57) ABSTRACT

A liquid crystal display in accordance with the present invention having a liquid crystal 25 held between a front substrate 21 and a back substrate 22 comprises a plurality of spacer units 221 which are formed on a surface of the back substrate 22 facing the front substrate 21 and have slits, a plurality of reflectors 222 which are formed on a surface of each of the spacer units 221, reflect light transmitted through the front substrate 21 and have slits corresponding to the slits in the spacer units 221, a color filter 223 which has a flat portion 223a formed on a surface of each reflector 222, and a projected portion 223b which reaches the back substrate 22 through the slit 220.

20 Claims, 7 Drawing Sheets

LIQUID CRYSTAL DISPLAY, MANUFACTURING METHOD THEREOF, AND ELECTRONIC APPLIANCE

BACKGROUND OF THE INVENTION

1. Technical Field of the Invention

The present invention relates to a liquid crystal display, a manufacturing method thereof, and an electronic appliance.

2. Description of the Related Art

Hitherto, so-called transflective liquid crystal displays have been used, which can, as required, switch between the reflective display mode in which the external light including natural light and artificial indoor light is incident from the obverse side and reflected to achieve the display, and the transmissive display mode in which light from a light source is incident from the back side to achieve the display.

FIG. 9 is a cross-sectional view schematically representing the configuration of the above transflective liquid crystal display. As shown in the figure, the transflective liquid crystal display substantially comprises a front substrate 501 and a back substrate 502, a liquid crystal 503 sealed in the space between these substrates, a light guide plate 505 to guide the light emitted from a light source 504 to the entire back substrate 502, and a transflector 506 interposed between the light guide plate 505 and the back substrate 502. The transflector 506 is a sheet with pearl pigment beads diffused in a resin which was disclosed in, for example, Japanese Unexamined Patent Application Publication No. 55-84975, and has the characteristic that a part of the incident light is reflected thereby; while the remaining part is transmitted therethrough. A polarizer 507 is bonded on the outer side (the side opposite to the liquid crystal 503) of the front substrate 501, and a color filter 508, a transparent electrode 509, etc. are formed on the inner side thereof. On the other hand, a polarizer 510 is bonded on the outer side (the side opposite to the liquid crystal 503) of the back substrate 502, and a transparent electrode 511, etc. is formed on the inner side thereof.

In such a configuration, during reflective display mode, the external light such as the sunlight and artificial indoor light is incident from the front substrate 501 side, is transmitted via the polarizer 507→the front substrate 501→the color filter 508→the transparent electrode 509→the liquid crystal 503→the transparent electrode 511→the back substrate 502→the polarizer 510→the transflector 506, is reflected by the transflector 506, is transmitted along the same path in the reverse direction, and is then emitted from the front substrate 501 side, and observed by a user.

On the other hand, during transmissive display mode, the light emitted from the light source 504 is guided to the entire panel by the light guide plate 505, a part of the light is transmitted through the transflector 506 and emitted from the front substrate 501 side via the polarizer 510→the back substrate 502→the transparent electrode 511→the liquid crystal 503→the transparent electrode 509→the color filter 508→the front substrate 501→the polarizer 507, and is observed by the user.

As described above, during reflective display mode, the light observed by the user (hereinafter, simply referred to as the "emitted light") is transmitted through the color filter 508 twice. On the other hand, during transmissive display mode, the emitted light is transmitted through the color filter 508 only once. Assuming that the intensity of the light incident from the front substrate 501 is equal to the intensity of the light irradiated from the light source at the back substrate 502, the color purity (the degree of coloring of the light) of the emitted light during transmissive display mode is substantially one half of the color purity of the emitted light during reflective display mode. If the color purity of the color filter 508 is improved, the color purity of the emitted light during transmissive display mode can be improved; however, under such conditions, a problem of reduced brightness during reflective display mode occurs. Thus, in the conventional transflective liquid crystal display, there is a problem in that color reproducibility during reflective display mode cannot be set to be the same as the color reproducibility during transmissive display mode.

Accordingly, the present invention has been made in light of the above problems, and an object of the present invention is to provide a liquid crystal display which can set the color reproducibility during reflective display mode to be the same as the color reproducibility during transmissive display mode, a manufacturing method thereof, and an electronic appliance.

SUMMARY OF THE INVENTION

In the present invention, there is provided a liquid crystal display having a liquid crystal held between a first substrate and a second substrate comprising a plurality of spacer units which are formed on a surface of the second substrate facing the first substrate and which have apertures, a plurality of reflectors which are formed on a surface of each of the spacer units, which reflect light transmitted through the first substrate, and which have apertures corresponding to the apertures of the spacer units, and a plurality of color filters having flat portions formed on a surface of each of the reflectors and a projected portion reaching the second substrate through the apertures in each reflector and each spacer unit.

Also in the present invention, there is provided a liquid crystal display having a liquid crystal held between a first substrate and a second substrate comprising a plurality of reflectors reflecting light transmitted through the first substrate which are formed on a surface of the second substrate facing the first substrate and which have apertures, a plurality of spacer units which are formed on a surface of each of the reflectors and have apertures corresponding to the apertures in the reflectors, and a plurality of color filters having a flat portion formed on a surface of each of the spacer units and a projected portion reaching the second substrate through the apertures in each of the reflectors and each of the spacer units.

In the present invention, during reflective display mode, the light incident from the first substrate is emitted after being transmitted through the flat portion of the color filter twice, and thus, the color reproducibility during reflective display mode is dependent on the thickness of the flat portion of the color filter. On the other hand, during transmissive display mode, the light irradiated from a light source (a backlight) is incident from the second substrate side, and emitted after being transmitted through the projected portion and the flat portion of the color filter, i.e., the apertures in the spacer unit and the reflector, and thus, the color reproducibility during transmissive display mode is dependent on the thickness of the projected portion and the flat portion of the color filter. Thus, the color reproducibility during reflective display mode and the color reproducibility during transmissive display mode can be independently set by individually selecting a thickness of the flat portion of the color filter and a thickness of the projected portion. Therefore, the color reproducibility during reflective display mode can be set to be the same as the color reproducibility during transmissive display mode.

The desired color reproducibility during transmissive display mode can be realized by adjusting a thickness of the projected portion, and a thickness of the projected portion can be easily adjusted by adjusting the thickness of the spacer unit. Even when the projected portion must be relatively thick in order to obtain the desired color reproducibility during transmissive display mode, there is an advantage in that the thickness of the projected portion sufficient for obtaining the desired color reproducibility can be ensured by forming the spacer unit of a predetermined thickness.

The second substrate may have a groove corresponding to each of the apertures, and the projected portion of the color filter may reach a bottom portion of the groove through the apertures in each of the reflectors and each of the spacer units. The projected portion can be formed thicker by the depth of the groove in addition to the thickness of the reflector and the spacer unit. Thus, even when the projected portion must be relatively thick in order to obtain the desired color reproducibility during reflective display mode, the spacer unit need not be formed thicker, and the increase in thickness of the liquid crystal display can be avoided.

In the present invention, there is provided a manufacturing method of a liquid crystal display having a liquid crystal held between a first substrate and a second substrate comprising: a spacer-unit forming step of forming a plurality of spacer units on a surface of the second substrate facing the first substrate, a reflector forming step of forming a reflector to reflect light transmitted through the first substrate on a surface of each of the spacer units, an aperture forming step of forming an aperture through each of the spacer units and the reflector formed on a surface of the spacer unit, and a color-filter forming step of forming a color filter having a flat portion located on the surface of each of the reflectors and a projected portion reaching the second substrate through the apertures in each of the reflectors and each of the spacer units.

In the present invention, there is provided a manufacturing method of a liquid crystal display having a liquid crystal held between a first substrate and a second substrate comprising: a reflector forming step of forming a plurality of reflectors to reflect light transmitted through the first substrate on the surface of the second substrate facing the first substrate, a spacer-unit forming step of forming a spacer unit on the surface of each of the reflectors, an aperture forming step of forming an aperture through each of the reflectors and the spacer unit formed on the surface of the reflectors, and a color-filter forming step of forming a color filter having a flat portion located on the surface of each of the pacer units and a projected portion reaching the second substrate through the apertures in each of the reflector and each of the spacer units.

The liquid crystal display manufactured by the liquid crystal display manufacturing method has an advantage in that the color reproducibility during reflective display mode and the color reproducibility during transmissive display mode can be independently optimized by individually selecting a thickness of the flat portion of the color filter and a thickness of the projected portion.

In addition, the liquid crystal display in accordance with the present invention has an advantage in that a thickness of the projected portion sufficient for obtaining a desired color reproducibility can be ensured by forming the spacer unit of a predetermined thickness even when the projected portion must be relatively thick in order to obtain a desired color reproducibility during reflective display mode.

The aperture forming step may comprise a step of forming apertures in the spacer units and a step of forming apertures in the reflectors.

The liquid crystal display manufacturing method may comprise a groove forming step of forming a groove corresponding to each aperture on a surface of the second substrate facing the first substrate, and, in the color filter forming step, a color filter having the flat portion and the projected portion reaching a bottom portion of the groove through the apertures in the reflector and the spacer unit may be formed. In the thus manufactured liquid crystal display, the thickness of the projected portion can be increased by the depth of the groove in addition to the thickness of the reflector and the spacer unit. Thus, even when the projected portion must be relatively thick in order to obtain the desired color reproducibility during reflective display mode, the spacer unit need not be so thick, and the increase in thickness of the liquid crystal display can be avoided.

Further, there is provided an electronic appliance comprising the liquid crystal display in the first or second aspect of the present invention as a display unit. This electronic appliance has an advantage in that the color reproducibility during reflective display mode and the color reproducibility during transmissive display mode can be independently optimized.

DETAILED DESCRIPTION OF THE PREFERRED EMBODIMENTS

The embodiments of the present invention will be further described below with reference to the attached drawings. These embodiments illustrate examples in accordance with the present invention, and the present invention is not limited thereto, and the embodiments can be arbitrarily modified within the scope of the present invention.

A: First Embodiment

Figure 1:
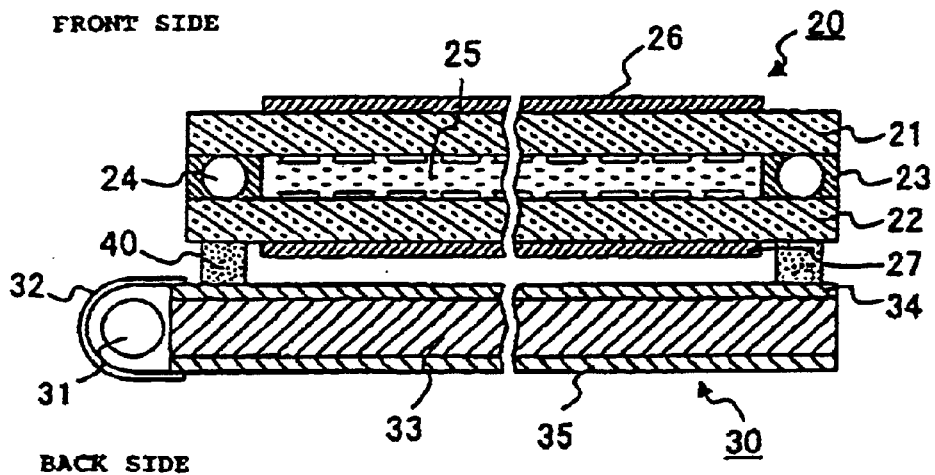
FIG. 1 is a cross-sectional view of the configuration of a liquid crystal display using a liquid crystal panel according to the first embodiment of the present invention.

FIG. 1 is a cross-sectional view schematically illustrating a transflective liquid crystal display according to the first embodiment of the present invention. In FIG. 1 and subsequent figures, the scale in each layer and each member differs so that each layer and each member is recognizable in the figure. Further, as shown in FIG. 1, the side of the liquid crystal panel with a backlight unit disposed thereon is referred to as the back side, and the side facing thereto (i.e., a surface with an image recognized by a user displayed thereon) is referred to as the front side.

As shown in FIG. 1, the transflective liquid crystal display substantially comprises a liquid crystal panel 20 and a backlight unit 30. In the liquid crystal panel 20, a front substrate 21 (a first substrate) and a back substrate 22 (a second substrate) are bonded together with a predetermined space therebetween by a sealant 23 with spacers 24 mixed therein, and a liquid crystal 25 of the TN (Twist Nematic) type, etc. is sealed in the space between these substrates. The front substrate 21 and the back substrate 22 are plate-like members formed of, for example, quartz, glass, plastic, etc. A polarizer 26 and a polarizer 27 are bonded on the front side of the front substrate 21 and on the back side of the back substrate 22, respectively, and the polarization axis is set according to the rubbing direction of alignment layers (which will be described below in detail) formed on the bonded substrates.

The backlight unit 30 is disposed on the back side of the back substrate 22 via a cushioning material 40 formed of a silicone rubber, etc. The backlight unit 30 comprises a bar-like fluorescent tube 31 emitting light, a reflector 32 reflecting light emitted from the fluorescent tube 31 and guiding it to a light guide plate 33, the light guide plate 33, a diffusing plate 34 uniformly diffusing the light guided to the light guide plate 33 over the back substrate 22 of the liquid crystal panel 20, and a reflector 35 reflecting light emitted from the light guide plate 33 to the side opposite to the liquid crystal panel 20 towards the liquid crystal panel 20 side. The fluorescent tube 31 is not constantly lit, but is lit according to an instruction from the user or a detection signal or the like from a sensor when the fluorescent tube is used in an environment with little external light, and the transmissive display mode is achieved thereby.

Figure 2:
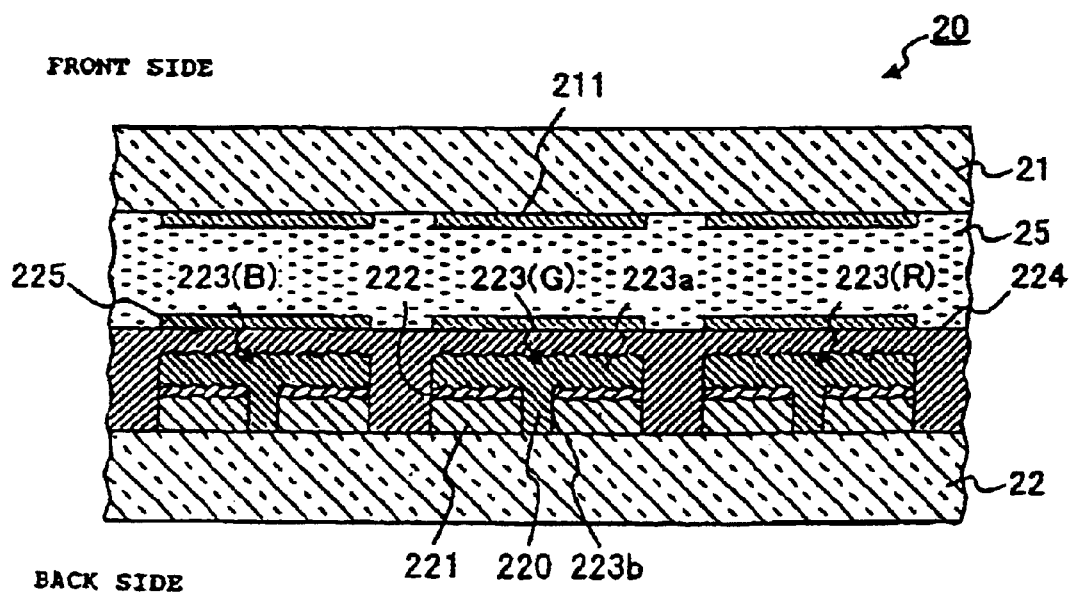
FIG. 2 is a cross-sectional view showing a part of the liquid crystal panel in the first embodiment.

FIG. 2 is a cross-sectional view showing the configuration of a portion of the above liquid crystal panel 20. In FIG. 2, the polarizers 26 and 27 shown in FIG. 1 are omitted.

As shown in the figure, a plurality of pixel electrodes 211 are formed in a matrix on the surface of the back side (the liquid crystal 25 side) of the front substrate 21. The pixel electrodes 211 are formed of, for example, a transparent material such as ITO (Indium Tin Oxide).

Figure 3A:
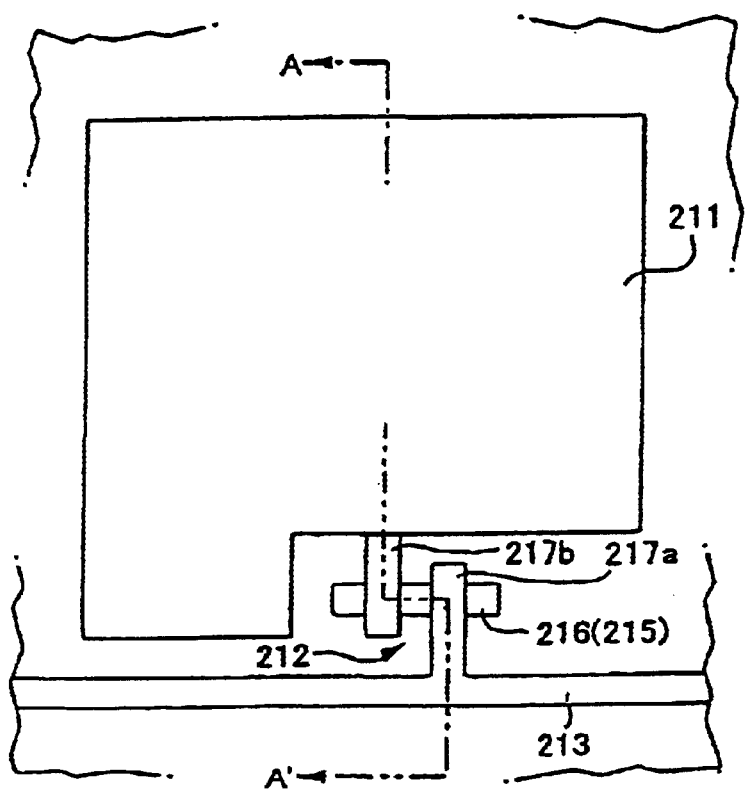
FIG. 3(a) is a plan view showing the configuration in the vicinity of each pixel electrode in the first embodiment.
Figure 3B:
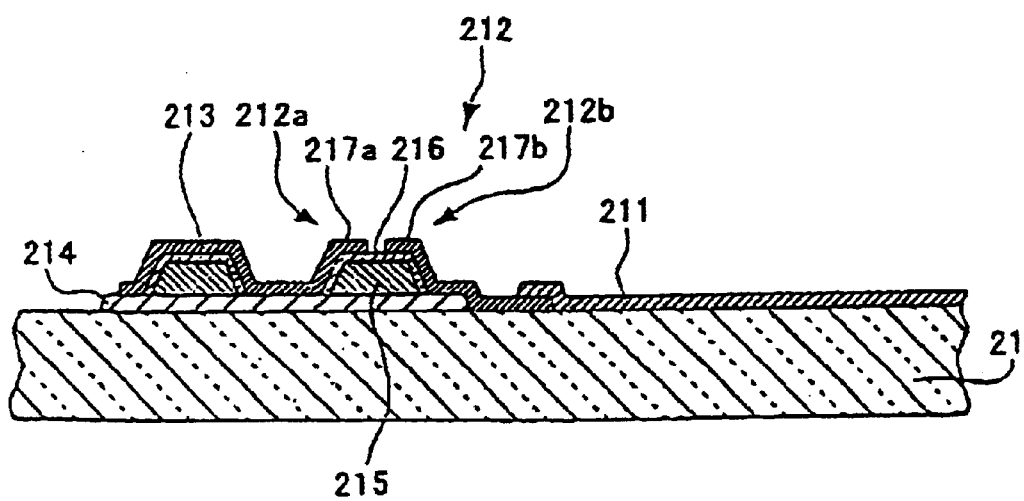
FIG. 3(b) is a cross-sectional view through the line A–A' in FIG. 3(a).

FIG. 3(a) is a plan view showing the configuration of the pixel electrodes 211 and a portion close thereto when viewed from the back side of the front substrate 21, and FIG. 3(b) is a cross-sectional view through the line A–A' in FIG. 3(a). As shown in FIGS. 3(a) and 3(b), each pixel electrode 211 is connected to a scanning wire 213 for applying a pixel voltage via a TFD (Thin Film Diode) 212. As shown in FIG. 3(b), the TFD 212 comprises a first TFD 212a and a second TFD 212b. The TFDs 212a and 212b are formed on the surface of an insulating film 214 covering the surface of the front substrate 21, and comprise a first metal film 215, an oxide film 216 which is an insulator formed by anode oxidation of the surface of the first metal film 215, and second metal films 217a and 217b formed on the upper surface of the oxide film 216 while maintaining a space therebetween. The second metal film 217a forms the scanning wire 213, and the second metal film 217b is connected to the pixel electrode 211.

The first TFD 212a, when viewed from the scanning wire 213 side, is formed of the second metal film 217a, the oxide film 216 and the first metal film 215 in that order, and has a metal-insulator-metal structure, and thus, the current-voltage characteristic thereof is non-linear in both positive and negative directions. On the other hand, the second TFD 212b, when viewed from the scanning wire 213 side, is formed of the first metal film 215, the oxide film 216, and a second metal film 327b in that order, and has a current-voltage characteristic opposite to that of the first TFD 212a. As described above, the TFD 212 comprises two elements connected in series opposite to each other, and the non-linear current-voltage characteristic becomes symmetric in both positive and negative directions in comparison with a case in which one element is used.

Referring back to FIG. 2, the surface of the front substrate 21 with the pixel electrodes 211 or the like formed thereon is covered by an alignment layer (not shown in the figure). The alignment layer is a thin film formed of an organic material such as polyimide, and is subjected to uniaxial alignment by, for example, a rubbing treatment. The liquid crystal 25 sealed between the substrates is aligned following the alignment layer in a state in which no electric field is applied from the pixel electrodes 211.

On the other hand, a spacer unit 221 is formed on the front surface of the back substrate 22 and in an area facing the pixel electrodes 211. The spacer unit 221 is a thin film formed of an acrylic resin, etc., and a slit 220 forming an aperture is formed therein. A plurality of uneven portions are formed on the upper surface of the spacer unit 221 as a result of etching or the like.

The upper surface of the spacer unit 221 is covered by a reflector 222. The reflector 222 is a thin film formed of a light reflective metal including aluminum, silver, nickel and chromium, and reflects the light incident from the front substrate 21 side to achieve the reflective display mode. The reflector 222 has a slit formed therein similar to the slit formed in the spacer unit 221. Uneven portions corresponding to the uneven portions formed on the upper surface of the spacer unit 221 are also formed on the reflector 222. Thus, the reflected light from the reflector 222 is scattered by the plurality of uneven portions.

A color filter 223 is a film formed of a resin material colored R (Red), G (Green) or B (Blue) by dyes and pigments. The color filter 223 integratedly comprises a flat portion 223a formed to cover the entire upper surface of the reflector 222 and a projected portion 223b projecting from the flat portion 223a to the back side. As described above, the slit 220 is provided in the reflector 222 and the spacer unit 221, and the projected portion 223b is formed so that it reaches the surface of the back substrate 22 through the slit 220. A black matrix to shield a space between colored patterns from the light is formed in an area other than the area on the back substrate 21 with the spacer unit 221, the reflector 222, and the color filter 223 formed thereon.

The surface of the back substrate 22 with the spacer unit 221, the reflector 222, and the color filter 223 formed thereon is covered by an overcoat layer 224 formed of an acrylic resin, an epoxy resin, or the like. The surface is covered in order to flatten projected portions formed of the spacer unit 221, the reflector 222, and the color filter 223 on the back substrate 22, and to prevent an organic material from leaking from the color filter 223 and degrading the liquid crystal 25. In addition, a plurality of opposing electrodes 225 are formed in strips on the front surface of the overcoat layer 224. The opposing electrodes 225 are transparent electrodes formed of ITO similar to, for example, the above pixel electrodes 211.

A dot matrix pixel is formed of the opposing electrodes 225 and the pixel electrodes 211 on the front substrate 21. In addition, the surface of the overcoat layer 224 with the opposing electrodes 225 formed thereon is covered by an alignment layer (not shown in the figure). The alignment layer is an organic thin film formed of a polyimide or the like, similar to the alignment layer covering the front substrate 21, and is subjected to uniaxial alignment by, for example, a rubbing treatment.

In this configuration, when the external light (i.e., sunlight and artificial indoor light) is incident in the liquid crystal panel 20 from the front substrate 21 side, the incident light is reflected by the reflector 222 and is emitted from the front substrate 21 to achieve the reflective display mode thereby. On the other hand, when the fluorescent tube 31 of the backlight unit 30 is lit, the emitted light is transmitted through the slit 220 formed in the spacer unit 221 and the reflector 222, and is emitted from the front substrate 21 to achieve the transmissive display mode.

Described in more detail, in the case of the reflective display mode, the incident light from the front side is transmitted via the polarizer 26 (not shown in FIG. 2)→the front substrate 21→the pixel electrodes 211→the liquid crystal 25→the opposing electrodes 225→the overcoat layer 224→the flat portion 223a of the color filter 223→the reflector 222→, is reflected by the reflector 222→, and is then emitted from the front substrate 21 via the above path in the reverse direction. The light incident on the front substrate 21 is thus colored by transmission through the flat portions 223a of the color filter 223 twice before the light is observed by the user.

On the other hand, in the case of the transmissive display mode, the light emitted from the backlight unit 30 is transmitted via the polarizer 27 (not shown in FIG. 2)→the back substrate 22→the projected portion 223b (the slit 220) of the color filter 223→the flat portion 223a of the color filter 223→the overcoat layer 224→the opposing electrodes 225→the liquid crystal 25→the pixel electrodes 211→the front substrate 21→the polarizer 26 (not shown in FIG. 2), is emitted therefrom, and is observed by the user. The light emitted from the backlight unit 31 is colored with transmission through the projected portion 223b and the flat portion 223a of the color filter 223 before it is observed by the user.

Thus, in the case of the reflective display mode, the reflected light is transmitted through the flat portion 223a of the color filter 223 twice, and thus the color reproducibility during reflective display mode is dependent on the thickness of the flat portion 223a of the color filter 223. On the other hand, in the case of the transmissive display mode, the light emitted from the backlight unit 30 is transmitted through the projected portion 223b and the flat portion 223a of the color filter 223, and thus the color reproducibility during transmissive display mode is dependent on the thickness of the projected portion 223b and the thickness of the flat portion 223a of the color filter 223. Thus, the color reproducibility during reflective display mode and the color reproducibility during transmissive display mode can be independently optimized by individually selecting the thickness of the flat portion 223a and the thickness of the projected portion 223b of the color filter 223.

This means that, for example, if the thickness of the projected portion is increased, a sufficient optical path length in the color filter with the light emitted from the backlight unit 30 is transmitted therethrough can be ensured. Thus, even in the case of the transmissive display mode, the light to be observed by the user can be sufficiently colored.

Here, by setting the thickness of the spacer unit 221 so that, for example, the thickness of the flat portion 223a of the color filter 223 is equal to the thickness of the projected portion 223b, the optical path length (substantially two times the thickness of the flat portion 223a) in the color filter 223 through which the light incident from the front substrate 21 during reflective display mode is substantially equal to the optical path length (the sum of the thickness of the flat portion 223a and the thickness of the projected portion 223b) in the color filter 223 through which the incident light from the back substrate 22 side is transmitted during transmissive display mode. Thus, assuming that the intensity of the light incident from the front substrate 21 is equal to the intensity of the light emitted from the backlight unit 30, the color reproducibility during reflective display mode can be substantially equal to the color reproducibility during transmissive display mode.

When no spacer unit 221 is disposed, i.e., when only the reflector 222 is interposed between the color filter 223 and the back substrate 22, the reflector 222 is very thin compared with the film thickness of the color filter 223, and the thickness of the projected portion 223b cannot be increased, and in some cases, the desired color reproducibility cannot be obtained. In the present embodiment, however, a thickness of the projected portion 223b equal to the sum of the thickness of the reflector 222 and the thickness of the spacer unit 221 can be ensured. Thus, even when the projected portion 223b must be relatively thick in order to obtain the desired color reproducibility during transmissive display mode, there is an advantage in that a thickness of the projected portion 223b sufficient for obtaining the desired color reproducibility can be ensured by forming the spacer unit 221 with a predetermined thickness.

B: Second Embodiment

In the first embodiment, the thickness of the projected portion 223b can be increased by providing the spacer unit 221, and the color reproducibility during transmissive display mode can be arbitrarily set thereby. However, if the spacer unit 221 is too thick, thus increasing the thickness of the projected portion 223b, it can be more difficult to achieve a lower profile of the liquid crystal panel 20 in some cases. Thus, in the present embodiment, a sufficient thickness of the projected portion 223b can be ensured without substantially increasing the thickness of the spacer unit 221.

Figure 4:
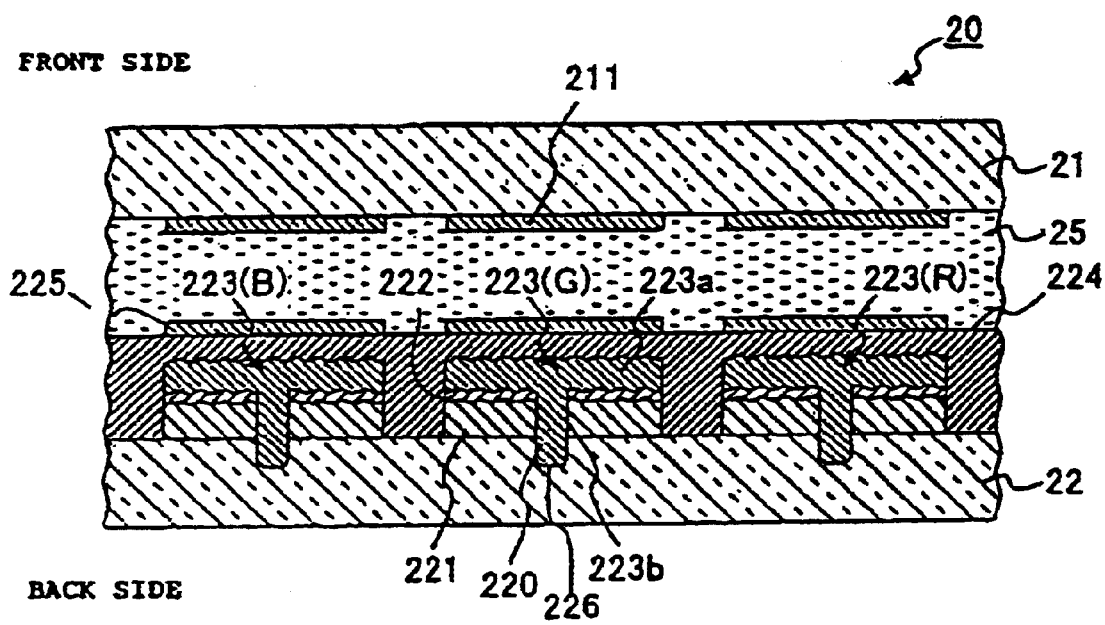
FIG. 4 is a cross-sectional view showing a part of a liquid crystal panel according to the second embodiment the present invention.

FIG. 4 is a cross-sectional view schematically representing the configuration of the liquid crystal panel 20 according to the second embodiment of the present invention. The components of the liquid crystal panel 20 according to the present embodiment which are identical to or correspond to those in the first embodiment in FIG. 2 are represented by the same reference numerals in FIG. 4 and a detailed description thereof is omitted.

In the present embodiment, the slit 220 is formed in the reflector 222 and the spacer unit 221 similarly to the above embodiment, and grooves 226 are formed in the back substrate 22 corresponding to areas having the slits 220 formed therein. The projected portion 223b projected from the flat portion 223a of the color filter 223 reaches a bottom portion of the groove 226 provided in the back substrate 22 through the slit 220 formed in the reflector 222 and the spacer unit 221.

In the first embodiment, a thickness of the projected portion 223b equal to the sum of the thickness of the reflector 222 and that of the spacer unit 221 can be ensured. However, the present embodiment has an advantage in that the thickness of the projected portion 223b can be further increased by the depth of the grooves 226 formed in the back substrate 22 in addition to the above thickness. Thus, the present embodiment has an advantage in that the range of selectable color reproducibility can be expanded. In addition, the grooves 226 are formed in the back substrate 22 itself, and thus, the liquid crystal panel 20 is not too thick.

C: Manufacturing Method of Liquid Crystal Panel 20

Next, a manufacturing method of the liquid crystal panel 20 will be described with reference to FIGS. 5(a) to 5(e), and FIGS. 6(f) to 6(i). Since the liquid crystal panel 20 according to the first embodiment can be manufactured by excluding a step forming the grooves 226 in the back substrate 22 from the manufacturing steps of the liquid crystal panel 20 according to the second embodiment, the manufacturing method of the liquid crystal panel 20 according to the second embodiment will be described below, and the manufacturing method of the liquid crystal panel 20 according to the first embodiment will also be described thereby.

Firstly, one surface of the back substrate 22 is covered by an acrylic resin layer 221', which will form the spacer unit 221 in a subsequent step, and a plurality of uneven portions (not shown in the figure) are formed on the surface of the acrylic resin layer 221' through etching, etc. Then, this surface is covered by a reflective layer 222 formed of aluminium, etc. As a result, a plurality of uneven portions are formed on a reflective layer 222'. In addition, a mask 230 to cover an area corresponding to the above reflector 222 and the spacer unit 221 overlaps the surface of the reflective layer 222' with the plurality of uneven portions formed thereon. This mask 230 has an aperture area in an area corresponding to the above slit 220 (see FIG. 5(a)).

Figure 5A:
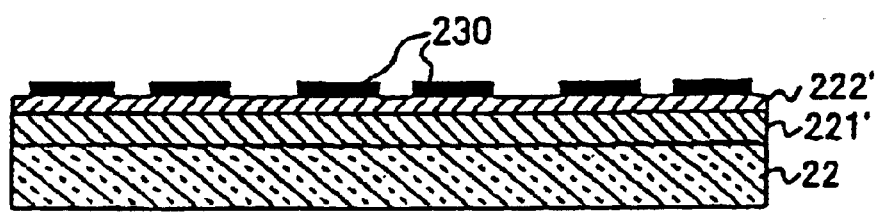
FIGS. 5(a)–(e) shows a manufacturing method of the liquid crystal display in accordance with the present invention.
Figure 5B:
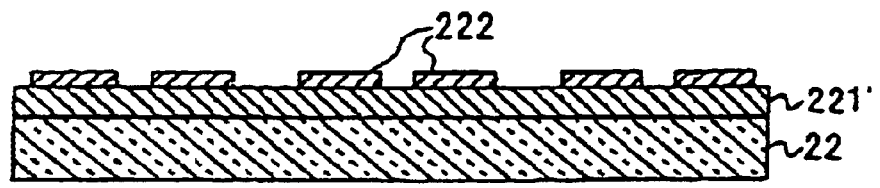
Figure 5C:
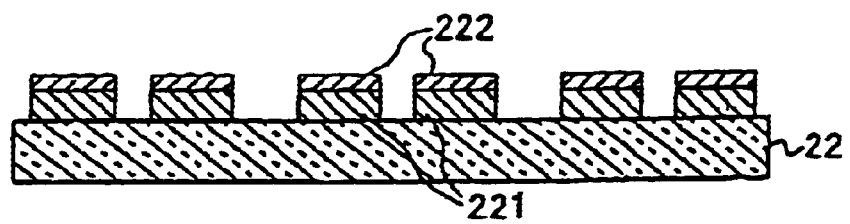

Next, the reflector 222 having the slit 220 is formed by peeling the mask 230 after the anisotropic etching is achieved on the surface covered by the mask 230 (see FIG. 5(b)). In addition, the anisotropic etching to remove the acrylic resin layer 221' apart from an area with the reflector 222 formed thereon is achieved. In this condition, the etching may be achieved after newly overlapping the mask 230 shown in FIG. 5(a), or the etching may be achieved using the above reflector 222 as a mask. As a result of the etching, the spacer unit 221 and the reflector 222 are formed on the back substrate 22 as shown in FIG. 5(c).

Figure 5D:
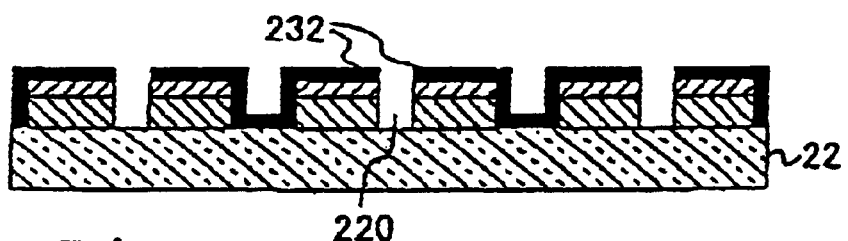
Figure 5E:
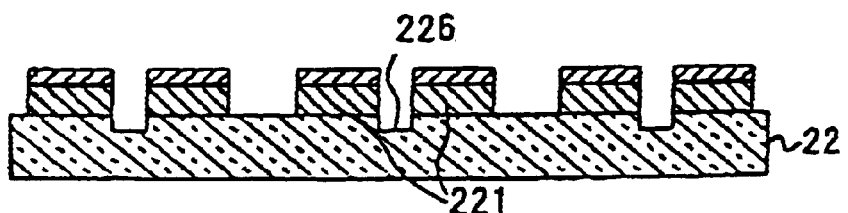

In addition, a mask 232 having an aperture in the area with the slit 220 formed therein overlaps the surface of the back substrate 22 with the spacer unit 221 and the reflector 222 formed thereon (see FIG. 5(d)), and anisotropic etching is performed on this surface. Grooves 226 corresponding to the slits 220 are formed on the back substrate 22, as shown in FIG. 5(e).

Figure 6F:
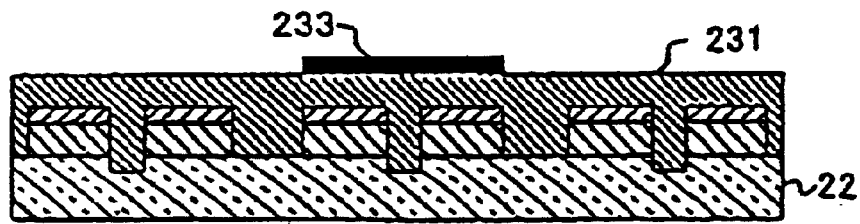
FIGS. 6(f)–(i) shows a manufacturing method of the liquid crystal display in accordance with the present invention.
Figure 6G:
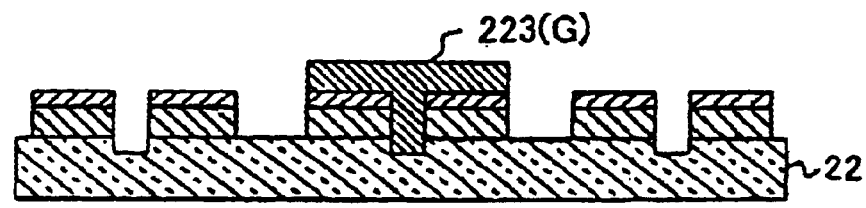
Figure 6H:
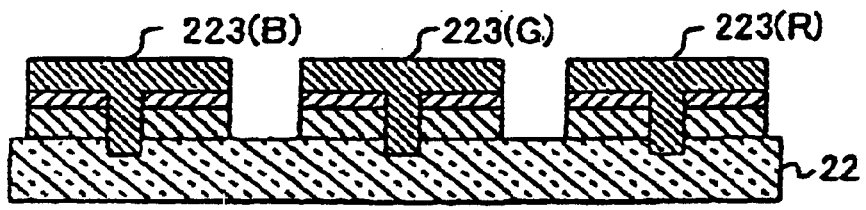

Next, as shown in FIG. 6(f), a resin material 231 colored either red, green or blue (a green resin material in FIG. 6(f)) by dyes or pigments is applied and planarized. The resin material 231 is applied so that the resin material is sufficiently infiltrated in the slits 220 and the grooves 226. A mask 233 overlaps an area on which the color filter 223 corresponding to the color of the resin material 231 is formed on the surface with the resin material 231 applied thereto, and anisotropic etching is performed thereon. Thus, the color filter 223 of any color among the above three colors (green in FIG. 6(g)) can be formed as shown in FIG. 6(g). This treatment is similarly performed for the other colors. The spacer unit 221, the reflector 222, and the color filter 223 of each color having the flat portions 223a and the projected portion 223b are formed on the back substrate 22, as shown in FIG. 6(h).

Figure 6I:
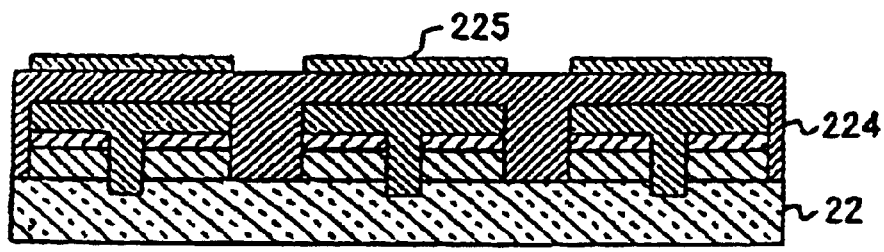

In addition, an acrylic resin, an epoxy resin, etc. is applied to the surface with these components formed thereon, and planarized to form an overcoat layer 224, and an opposing electrode 225 formed of ITO, etc. formed in an area corresponding to each color filter is formed on an upper surface of the overcoat layer 224 (see FIG. 6(i)).

The substrate formed in the above procedures is joined with the front substrate 21 with the pixel electrodes 211 and the TFD 212 formed thereon by a sealant. In the joining, the color filter 223, the reflector 222 and the spacer unit 221 formed on the back substrate 22, and the pixel electrodes 211 formed on the front substrate 21 are aligned corresponding to each other. The liquid crystal is sealed in a space between these substrates, and the polarizer 26 and the polarizer 27 are bonded on the surface of the front substrate 21 and the surface of the back substrate 22, respectively. The liquid crystal panel 20 can thus be manufactured.

The above manufacturing method is only an example, and the manufacturing method of the liquid crystal panel 20 in accordance with the present invention is not limited thereto. For example, in the above example, the acrylic resin layer 221' and the reflective layer 222' are formed on the back substrate 22, and then, the etching is successively performed for each layer; however, the etching may be achieved every time each layer is formed. For example, the back substrate 22 is etched to form the grooves 226, and the acrylic resin layer 221' is formed on the upper surface thereof. Then, the acrylic resin layer 221' is etched to form the spacer unit 221 shown in FIG. 2. In addition, the reflective layer 222' is formed on the upper surface thereof to form the reflector 222.

Further, in the above example, the mask having the aperture overlaps all areas with the slit 220 formed therein and the anisotropic etching is performed thereon as shown in FIG. 5(d), and thus, every groove 226 is formed of the same depth; however, the depth of the grooves is not limited thereto, and the depth of the grooves 226 may be changed according to the color of the corresponding color filter. In this example, the following steps may be performed in place of the step shown in FIG. 5(d). This means that the mask having the aperture only in the area having the slit 220 corresponding to the color filter of any one color of the three colors (red, blue and green) overlaps, anisotropic etching is performed thereon, and similar steps may be repeated with the etching degree different for the two other colors. The thickness of the projected portion 223b of the color filter 223 formed by the steps shown in FIGS. 6(f) to 6(h) can be different for each color of each color filter with an advantage in that a desired color reproducibility can be realized for each color.

D: Applications

Figure 7:
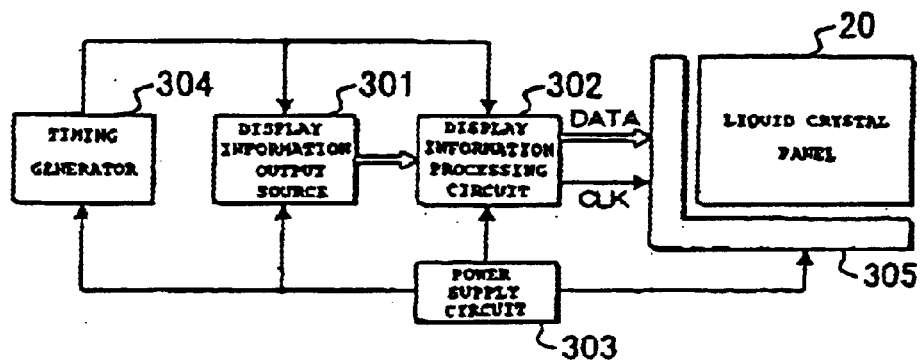
FIG. 7 is a block diagram showing a schematic configuration of an electronic appliance to which the liquid crystal panel according to each embodiment is applied.

Next, an application will be described, in which the liquid crystal according to the above embodiments is used for a display device of various kinds of electronic appliances. The electronic appliances comprise a display information output source 301, a display information processing circuit 302, a power supply circuit 303, a timing generator 304, a drive circuit 305 and the above liquid crystal panel 20 as illustrated in FIG. 7.

The display information output source 301 comprises memories including a ROM and a RAM, storage units including various kinds of disks, a tuning circuit to tune and output the digital image signal, etc., and outputs the display information including the image signal of a predetermined format to the display information processing circuit 302 based on various kinds of clock signals outputted by the timing generator 304. The display information processing circuit 302 comprises an inverting amplifier circuit, a rotation circuit, a gamma correction circuit, and a clamp circuit, and various kinds of known circuits, processes the supplied display information, and supplies the image signal to the drive circuit 305 together with the clock signal. The drive circuit 305 drives the pixel electrodes 211 and the opposing electrodes 225 shown in. FIG. 2 according to the supplied image signal. The power supply circuit 303 supplies predetermined power to each component.

Specific examples of the above electronic appliances include a portable personal computer, a cellular phone, a view-finder type or monitor-direct-view type video tape recorder, a car navigation device, a pager, an electronic notebook, a desk top calculator, a word processor, a workstation, a TV telephone, a POS terminal, and a touch panel.

E: Modifications

One embodiment of the present invention is described above; however, the above embodiment is only an example, and various kinds of modification can be added to the scope so that they do not deviate from the object of the present invention. For example, the modifications include the following.

<Modification 1>

Figure 8:
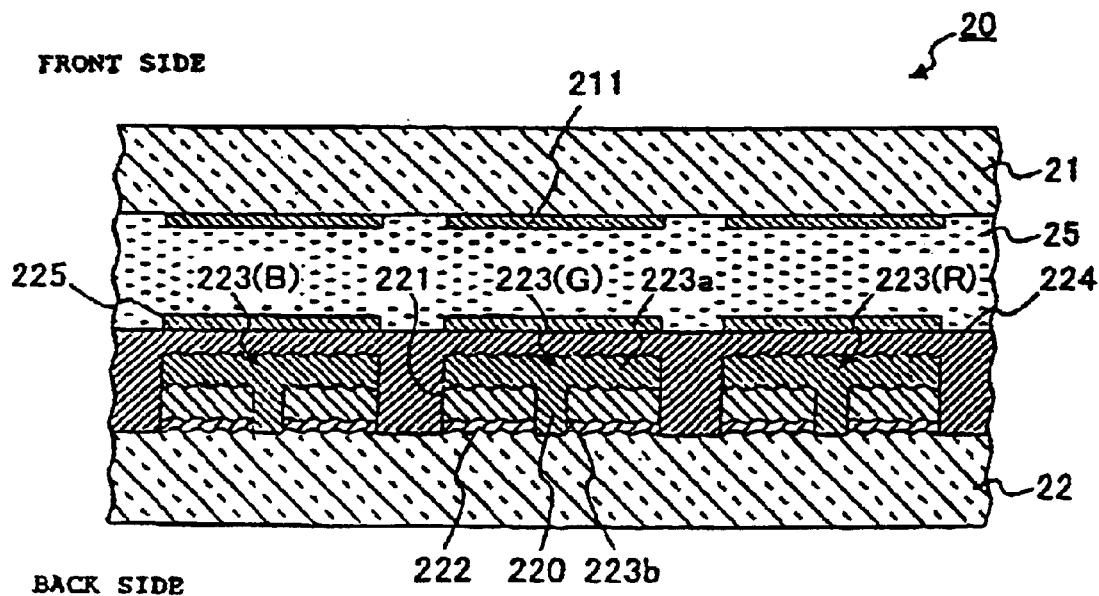
FIG. 8 is a cross-sectional view showing the configuration of a modification of the liquid crystal panel according to the first embodiment of the present invention.
Figure 9:
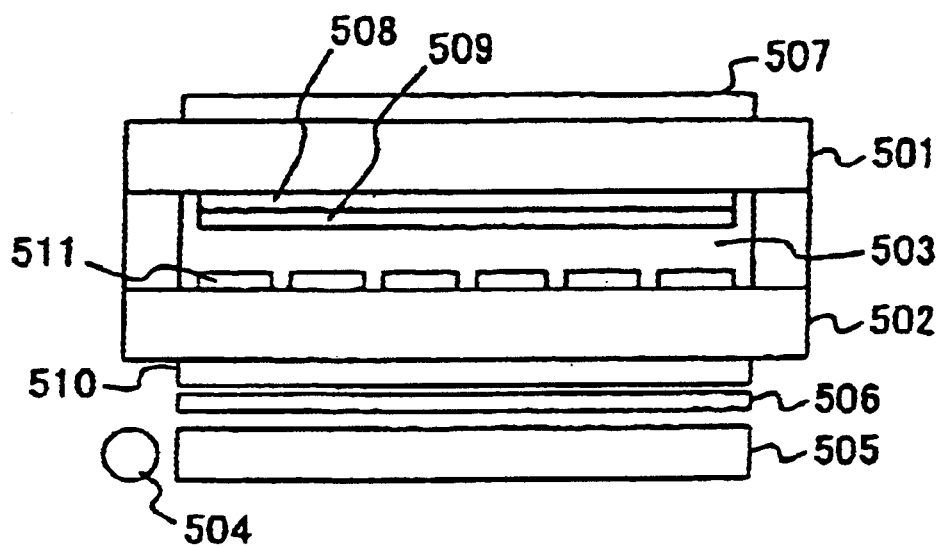
FIG. 9 is a cross-sectional view illustrating the configuration of a conventional liquid crystal panel.

In each embodiment described above, the spacer unit 221 is disposed on the upper surface of the back substrate 22, and the reflector 222 is disposed on the upper surface thereof; however, the spacer unit 221 and the reflector 222 may be located oppositely. This means that, as shown in FIG. 8, the reflector 222 is disposed on the upper surface of the back substrate 22, the spacer unit 221 is disposed on the upper surface of the reflector, and the slit 220 is formed through these components. A color filter having the flat portion 223a and the projected portion 223b reaching the back substrate 22 through the slit 220 is formed on the upper surface of the spacer unit 221. However, the spacer unit 222 must be transparent in this configuration. Also, a plurality of uneven portions to appropriately scatter the reflected light may be formed on the reflector 222 by forming a plurality of uneven portions as a result of the etching or the like in an area with the reflector 222 on the back substrate 22 formed therein.

A similar effect to that of the above first embodiment can also be obtained in this configuration. Also in the configuration shown in FIG. 8, the grooves 226 are formed at the position corresponding to the slits 220 on the back substrate 22 so that the projected portions 223b reach the bottom portion of the grooves 226.

<Modification 2>

In the above second embodiment, the slits 220 are provided in the reflector 222 and the spacer unit 221, and the grooves 226 corresponding to the slits 220 are formed on the back substrate. However, the spacer unit 221 is unnecessary if the projected portion 223b having a thickness to realize a desired color reproducibility is formed only by providing the grooves 226 on the back substrate 22.

<Modification 3>

In each of the above embodiments, a plurality of uneven portions are formed on the reflector 222 by a plurality of uneven portions formed on the upper surface of the spacer unit 221; however, the configuration is not limited thereto, and, for example, a plurality of uneven portions are formed as a result of the etching or the like in an area with the spacer unit 221 and the reflector 222 on the back substrate 22 formed therein, and the spacer unit 221 or the reflector 222 (in the above modification 1) may be formed on the upper surface thereof. Also in this configuration, a plurality of uneven portions to scatter the reflected light can be formed on the reflector 222.

<Modification 4>

In each of the above embodiments, the TFD 212 is used as a switching element; however, the switching element is not limited thereto, and an element having a diode element structure such as an MSI (Metal Semi-Insulator) or a three-terminal element such as a thin film transistor may be used. Further, the present invention is applicable not only to the active matrix liquid crystal panel to drive the pixel electrodes by these switching elements, but also to a passive matrix liquid crystal panel having no switching elements.

As described above, in the present invention, the color reproducibility during reflective display mode can be set to be the same as the color reproducibility during transmissive display mode by individually selecting the thickness of the flat portion of the color filter and the thickness of the projected portion.

What is claimed is:

1. A liquid crystal display having a liquid crystal held between a first substrate and a second substrate comprising:
   a plurality of spacer units which are formed on a surface of said second substrate facing said first substrate and which have apertures;
   a plurality of reflectors which are formed on a surface of each of said spacer units, which reflect light transmitted through said first substrate, and which have apertures corresponding to the apertures of said spacer units; and
   a plurality of color filters having a first portion formed on a-surface of each of said reflectors and a projected portion reaching said second substrate through the apertures in each reflector and each spacer unit.

2. A liquid crystal display according to claim 1,
   wherein a groove corresponding to each of said apertures is formed on a surface of said second substrate facing said first substrate, and said projected portion of said color filter reaches a bottom portion of said groove through the apertures in each of said reflectors and each of said spacer units.

3. An electronic appliance having a liquid crystal display according to claim 1 as a display unit.

4. A liquid crystal display according to claim 1,
   further comprising an overcoat layer covering the color filters which have the first portion and the projected portion, the overcoat layer flattening a surface of the color filters.

5. A liquid crystal display according to claim 1,
   wherein the spacer units have a predetermined thickness which is thicker than a thickness of the reflectors.

6. A liquid crystal display according to claim 1,
   further comprising uneven portions formed on an upper surface of the reflectors.

7. A liquid crystal display having a liquid crystal held between a first substrate and a second substrate comprising:
   a plurality of reflectors reflecting light transmitted through said first substrate which are formed on a surface of said second substrate facing said first substrate and which have apertures;
   a plurality of spacer units which are formed on a surface of each of said reflectors and have apertures corresponding to apertures in said reflector; and
   a plurality of color filters having a first portion formed on a surface of each of said spacer units and a projected portion reaching said second substrate through the apertures in each of said reflectors and each of said spacer units.

8. A liquid crystal display according to claim 7,
   wherein a groove corresponding to each of said apertures is formed on a surface of said second substrate facing said first substrate, and said projected portion of said color filter reaches a bottom portion of said groove through the apertures in each of said reflectors and each of said spacer units.

9. A liquid crystal display according to claim 2, further comprising uneven portions formed on an upper surface of the reflectors.

10. A liquid crystal display according to claim 2, wherein the spacer units have a predetermined thickness which is thicker than a thickness of the reflectors.

11. A manufacturing method of a liquid crystal display having a liquid crystal held between a first substrate and a second substrate comprising:

a spacer-unit forming step of forming a plurality of spacer units on a surface of said second substrate facing said first substrate;

a reflector forming step of forming a reflector to reflect light transmitted through said first substrate on a surface of each of said spacer units;

an aperture forming step of forming an aperture through each of said spacer units and the reflector formed on the surface of said spacer unit; and a color-filter forming step of forming a color filter having a first portion located on the surface of each of said reflectors and a projected portion reaching said second substrate through the apertures in each of said reflectors and each of said spacer units.

12. A liquid crystal display manufacturing method according to claim 11, wherein said aperture forming step further comprises a step of forming apertures in said spacer units and a step of forming apertures in said reflectors.

13. A liquid crystal display manufacturing method according to claim 11 further comprising a groove forming step of forming a groove corresponding to each of said apertures on the surface of said second substrate facing said first substrate, wherein said color-filter forming step forms said color filter having said first portion and a projected portion reaching a bottom portion of said groove through the apertures in said reflectors and said spacer units.

14. A liquid crystal display manufacturing method according to claim 11, further comprising an overcoat layer forming step of forming an overcoat layer to cover the color filter having the first portion and the projected portion.

15. A liquid crystal display manufacturing method according to claim 11, further comprising an uneven portion forming step of forming a plurality of uneven portions on an upper surface of the spacer units.

16. A manufacturing method of a liquid crystal display having a liquid crystal held between a first substrate and a second substrate comprising:

a reflector forming step of forming a plurality of reflectors to reflect light transmitted through said first substrate on a surface of said second substrate facing said first substrate;

a spacer-unit forming step of forming a spacer unit on a surface of each of said reflectors;

an aperture forming step of forming an aperture through each of said reflectors and the spacer units formed on the surface of said reflector; and a color-filter forming step of forming a color filter having a first portion located on the surface of each of said spacer units and a projected portion reaching said second substrate through the apertures in each of said reflectors and each of spacer units.

17. A liquid crystal display manufacturing method according to claim 16, wherein said aperture forming step further comprises a step of forming apertures in said spacer units and a step of forming apertures in said reflectors.

18. A liquid crystal display manufacturing method according to claim 16 further comprising a groove forming step of forming a groove corresponding to each of said apertures on the surface of said second substrate facing said first substrate, wherein said color-filter forming step forms said color filter having said first portion and a projected portion reaching a bottom portion of said groove through the apertures in said reflectors and said spacer units.

19. A liquid crystal display manufacturing method according to claim 16, further comprising an overcoat layer forming step of forming an overcoat layer to cover the color filter having the first portion and the projected portion.

20. A liquid crystal display manufacturing method according to claim 16, further comprising an uneven portion forming step of forming a plurality of uneven portions on the surface of the second substrate.

\* \* \* \* \*

UNITED STATES PATENT AND TRADEMARK OFFICE
CERTIFICATE OF CORRECTION

PATENT NO. : 6,657,687 B2
DATED : December 2, 2003
INVENTOR(S) : Takizawa

It is certified that error appears in the above-identified patent and that said Letters Patent is hereby corrected as shown below:

Column 3,
Line 54, "pacer" should be -- spacer --

Column 4,
Lines 45 and 48, "shows" should be -- show --

Column 13,
Lines 5 and 8, "claim 2" should be -- claim 7 --

Signed and Sealed this

Seventh Day of September, 2004

JON W. DUDAS
*Director of the United States Patent and Trademark Office*